United States Patent [19]

Sowry

[11] Patent Number: 5,906,227
[45] Date of Patent: May 25, 1999

[54] TIRE INFLATION METHOD AND APPARATUS

[75] Inventor: Clive Robert Sowry, Sandton, South Africa

[73] Assignee: L'Air Liquide, Societe Anonyme Pour L'etude et L'Exploiatation Des Procedes Georges Claude, Paris, Cedex, France

[21] Appl. No.: 08/796,729

[22] Filed: Feb. 7, 1997

[30] Foreign Application Priority Data

Feb. 7, 1996 [ZA] South Africa ............... 96/0965

[51] Int. Cl.$^6$ ................................. F16K 37/00
[52] U.S. Cl. ................. 141/65; 141/4; 141/38; 141/59; 141/95; 137/228
[58] Field of Search ................. 141/4, 38, 59, 141/65, 67, 95; 137/223, 227, 228

[56] References Cited

U.S. PATENT DOCUMENTS

| | | | |
|---|---|---|---|
| 1,487,851 | 3/1924 | Hammond et al. | 137/228 |
| 1,652,675 | 12/1927 | Key | 137/227 |
| 2,525,256 | 10/1950 | Byram | 141/38 |
| 2,581,914 | 1/1952 | Darrow | 141/38 |
| 2,592,759 | 4/1952 | Sullivan | 141/38 |
| 2,652,181 | 9/1953 | Rupp | 141/38 |
| 2,869,573 | 1/1959 | Stafford | 137/223 |
| 3,021,877 | 2/1962 | Wellsch | 141/38 |
| 3,043,348 | 7/1962 | Wellsch | 141/38 |
| 3,468,348 | 9/1969 | Sperberg | 141/38 |
| 3,498,341 | 3/1970 | Sperberg | 141/4 |
| 3,498,343 | 3/1970 | Sperberg | 141/38 |
| 3,877,496 | 4/1975 | Sperberg | 141/4 |

Primary Examiner—J. Casimer Jacyna
Attorney, Agent, or Firm—Burns, Doane, Swecker & Mathis, L.L.P.

[57] ABSTRACT

The invention relates to a method of inflating a tire comprising the steps of:

providing a tire mounted on a rim, said tire comprising a tire valve to allow selective inflation or deflation of said tire, said tire being filled with a certain amount of air;

deflating said tire to reach a pressure which is less than or equal to a predetermined low pressure, said predetermined low pressure being lower than atmospheric pressure;

inflating said tire with a source of inert gas to reach a pressure at least equal to a pressure greater than atmospheric pressure, to obtain inside said tire a gas mixture comprising between 5% $O_2$ by volume and 0.5% O2 by volume.

It also relates to a tire evacuation apparatus specially adapted thereto.

28 Claims, 1 Drawing Sheet

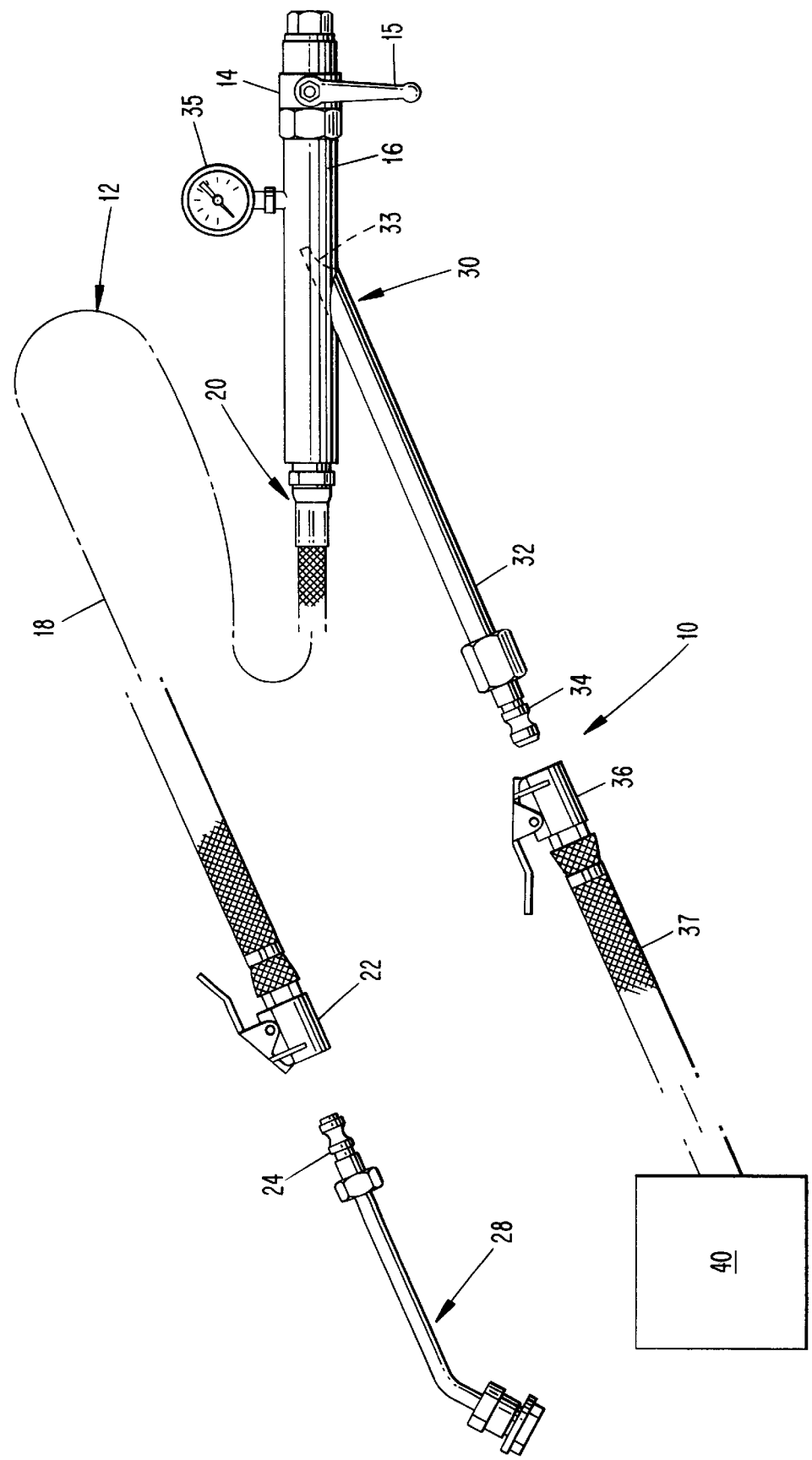

TIRE INFLATION METHOD AND APPARATUS

BACKGROUND OF THE INVENTION

This invention relates to tire inflation and evacuation methods and apparatus.

It is widely accepted that deterioration of rubber-based vehicle tires is attributable, at least in part, to the presence of oxygen in the gas with which the tires are inflated. For this reason it is common practice, for instance in the case of aircraft tires, to inflate the tires with inert nitrogen rather than compressed air. Conventionally, this is achieved by inflating the tires from cylinders containing compressed nitrogen.

If a tire previously inflated with air is to be inflated with nitrogen, the tire valve is initially removed or manipulated to allow the air to escape. While the air pressure in the tire is greater than ambient atmospheric pressure, the air will escape freely. However, when the internal and external pressures reach equilibrium, the tire will remain charged with a volume of air at atmospheric pressure. In an attempt to get rid of this residual air, the existing practice is to use a purging system in which, after deflation of the tire to atmospheric pressure, the tire is re-inflated with pure nitrogen. The oxygen content of the residual air is accordingly diluted. The tire is once again deflated and immediately re-inflated once again with pure nitrogen, thereby further diluting the oxygen content of the gas within the tire. This process of deflation and re-inflation may have to be carried out several times to achieve an acceptably pure nitrogen level. Repetitive deflation and re-inflation is, however, time-consuming and wasteful of nitrogen.

It has been unexpectedly discovered that when there is less than about 5% (by volume) $O_2$, and preferably 3% (by volume) $O_2$ in the gas mixture filling the tire, deterioration of the tire is substantially similar to deterioration of a tire filled with substantially pure nitrogen, while deterioration of the tire substantially increases when the tire is filled with air. Maximum deterioration of the tire occurs when the tire is filled up with air, i.e., with a gas mixture comprising about 21% (by volume) $O_2$.

SUMMARY OF THE INVENTION

Based on this unexpected result, a simple and inexpensive method of inflating tires with inert gas has been developed. According to the invention there is provided a method of inflating a tire wherein a tire is mounted on a rim comprising a tire valve to inflate or deflate the tire, the tire being filled with a certain amount of air. The tire is deflated to reach a pressure which is at most equal to, or smaller than a predetermined low pressure, lower than atmospheric pressure. The tire is thereafter inflated with a source of inert gas to reach a pressure at least equal to a recommended pressure greater than atmospheric pressure, in order to obtain inside the tire a gas mixture comprising less than about 5% $O_2$ by volume.

Deflating the tire under ambient pressure can be done by any means to create a suction, such as a pump, venting system, etc, including a suction means as disclosed hereafter. This suction means is preferably able to suction air from the tire in order to reach a pressure well below atmospheric pressure, preferably about at least 10 kpa below atmospheric pressure and more preferably at least 50 Kpa below atmospheric pressure.

After deflation of the tire, inflation with impure nitrogen containing less than 5% (by volume) $O_2$, preferably less than 3% (by volume) $O_2$, can be performed to obtain a gas mixture in the tire. Alternatively, Argon or any other inert gas may be used, as would be readily apparent to one of ordinary skilled in the art.

Filling a tire with pure nitrogen or industrially pure nitrogen (such as nitrogen obtained from a cryogenic unit with which cylinders are thereafter filled up, which contains 99.95% vol. N2) as taught by prior art, is very expensive.

According to the invention, it has been found that it would be usually extremely difficult and unreasonably expensive to have a gas mixture within the inflated tire comprising less than about 1% vol. O2, particularly when inflating the tire is done in one step. Accordingly, it is another object of the invention to fill up tires with so called impure nitrogen, i.e. nitrogen gas (in admixture or not, with argon or any other inert gas) containing not less than about 0.5% of O2 and preferably not less than about 1% vol. of oxygen, in order to obtain after inflation of the tire a gas mixture within said tire comprising between about 5% vol. and 0.5% vol. of oxygen and comprising preferably less than about 3% vol. of oxygen. Most preferably, about at least 1% vol. O2 is appropriate.

While nitrogen PSA (Pressure Swing Adsorption device) may be in certain circumstances appropriate, the purity of the nitrogen gas produced by such devices is usually between 95% and 99.5% vol. of nitrogen. They are used to carry out the invention only in those cases where an important flow of nitrogen gas is necessary. It is however preferred to use nitrogen membranes generators, as disclosed hereafter. In both cases, a gas mixture containing more than 90% vol. of N2 and usually more than 95% vol. can be produced by those PSA or membrane generators.

Depending on the purity of the nitrogen produced and the oxygen content targeted into the tire, the pressure at which the tire is, in a first step, deflated may vary and be adapted by the man skilled in the art. However, it is usually recommended to reach a predetermined low pressure which is usually at least 10 Kpa below atmospheric pressure (particularly for truck tires) and more preferably at least 50 Kpa below atmospheric (particularly for car tires).

According to a preferred embodiment of the invention, suction of air from the tire may be accomplished by means of an inert gas, e.g., nitrogen, source. The high pressure, e.g., pressure greater than atmospheric pressure, of the inert gas from the inert gas source may be used to generate the suction and thus the low pressure of the air remaining in the tire.

It is one particular advantage of the invention to use an "on-site" nitrogen generator such as generators comprising compressing means to compress air at a pressure greater than atmospheric pressure, typically several bar of pressure. The compressed air, after filtration, water vapor removal, etc. . . . is fed to the feed side of a membrane unit which includes a membrane of polyimide, polyamide, polyolefin, or other glassy polymer. On the non-permeate (feed) side of the membrane, a nitrogen enriched gas mixture is withdrawn which comprises less than about 5% (by volume) $O_2$, and on the permeate side of the membrane (preferably, but not necessarily, the bore side) an oxygen enriched gas mixture at ambient or lower pressure is vented.

According to a first aspect of the invention, there is provided a method of inflating a tire comprising the steps of:
providing a tire mounted on a rim, said tire comprising a tire valve to allow selective inflation or deflation of said tire, said tire being filled with a certain amount of air;
deflating said tire to reach a pressure which is less than or equal to a predetermined low pressure, said predetermined low pressure being lower than atmospheric pressure;

inflating said tire with a source of inert gas to reach a pressure at least equal to a pressure greater than atmospheric pressure, to obtain inside said tire a gas mixture comprising between 5% $O_2$ by volume and 0.5% O2 by volume.

According to another aspect of the invention, there is provided a method of inflating a tire with nitrogen or other inert gas, wherein:

a first conduit is coupled to the tire valve, the tire valve being open to allow gas with which the tire is already charged to escape along the first conduit, a purging gas is directed under pressure into the first conduit through a second conduit which intersects the first conduit at a position remote from the valve and at an acute angle, the purging gas being directed into the first conduit in a downstream direction with the result that a sub-atmospheric pressure is created in the first conduit and the gaseous content of the tire are withdrawn along the first conduit, and once a required degree of evacuation of the tire has been achieved, the first conduit is uncoupled from the tire valve and the tire is inflated to a predetermined pressure with the nitrogen or other inert gas through the valve.

In the preferred implementation of the method, the purging gas is nitrogen.

According to another aspect of the present invention there is provided a method of deflating a tire and thereafter re-inflating it, through a tire valve associated with the tire, with an inert gas, typically nitrogen, the method including the steps of:

opening the tire valve in and connecting a first end of a first conduit thereto so that gas can vent from the tire to atmosphere through an opposite, second end of the first conduit;

introducing compressed inert gas into the first conduit in a manner to cause a pressure reduction in the first conduit which increases the rate at which gas is vented to atmosphere from the tire; and when the gas pressure in the tire reaches a sub-atmospheric level, closing the second end of the first conduit so that the compressed inert gas flows back along the first conduit and into the tire through the tire valve, thereby to re-inflate the tire with the inert gas.

The inert gas is preferably introduced into the first conduit along a second conduit which intersects the first conduit, most preferably at an acute angle.

In order to achieve a final tire pressure adjustment after the tire has been re-inflated with the inert gas, the first-end of the first conduit is disconnected from the tire valve, the core of the tire valve is replaced, and further compressed inert gas is introduced into the tire to replenish the tire with inert gas lost from the tire during such disconnection and core replacement and to inflate the tire to a final, desired inflation pressure.

Further according to the invention there is provided a tire evacuation apparatus comprising a first conduit at least a portion of the length of which is flexible, a tire valve coupler at a free end of the flexible portion of the first conduit by means of which the first conduit can be coupled to a tire valve, a second conduit which intersects the first conduit at a position remote from the free end, the second conduit making an acute angle with that section of the first conduit between the intersection and the free end, and a coupler at a free end of the second conduit by means of which the second conduit can be coupled to a source of purging gas under pressure, the arrangement being such that with the tire valve coupler coupled to the tire valve of a tire which is to be evacuated, and purging gas directed under pressure into the first conduit through the second conduit, the gaseous contents of the tire are withdrawn to a sub-atmospheric pressure level.

According to another embodiment of the device according to the invention there is provided a tire deflation and inflation apparatus for deflating a tire and thereafter inflating it with an inert gas, the tire having a tire valve associated therewith, the apparatus comprising:

a first conduit at least a portion of which is flexible;

a tire valve coupler at a first end of the first conduit by means of which the first conduit can be coupled to the tire valve, after opening of the tire valve, so that gas can vent from the tire to atmosphere through an opposite, second end of the first conduit;

a control valve at or towards an opposite, second end of the first conduit;

a second conduit which intersects the first conduit between the tire valve coupler and the control valve; and a coupler at a free end of the second conduit by means of which the second conduit can be connected to a source of compressed inert gas; wherein:

the intersection between the first conduit and the second conduit is such that compressed inert gas introduced into the first conduit through the second conduit causes a pressure reduction in the first conduit which increases the rate at which gas is vented to atmosphere from the tire and enables the tire pressure to be reduced to a sub-atmospheric level; and closure of the control valve after such reduction of the tire pressure causes compressed inert gas to flow back along the first conduit and into the tire through the tire valve thereby to re-inflate the tire to a required level with the inert gas.

In a particular simple and convenient and simple arrangement, the second conduit intersects the first conduit at an acute angle defined between the second conduit and a portion of the first conduit between the intersection and the tire valve coupler.

The first conduit preferably includes a flexible portion carrying the tire valve coupler and a rigid portion to which the first portion is connected and at which the first conduit is intersected by the second conduit. The rigid portion of the first conduit may be provided by a first pipe and the second conduit by a second rigid pipe of smaller diameter than the first rigid pipe.

BRIEF DESCRIPTION OF THE DRAWINGS

The invention will now be described in more detail, by way of example only, with reference to the accompanying drawing which illustrates an exemplary apparatus used to evacuate a tire in an exploded view.

DETAILED DESCRIPTION OF THE INVENTION

The drawing shows a tire evacuation apparatus 10 which includes a first, evacuation conduit 12 having an outlet end fitted with a ball valve 14. The handle of the ball valve 14 is designated with the reference numeral 15. Over a first portion of its length, the conduit 12 is provided with a rigid pipe 16. The remaining portion of the length of the conduit 12 is provided with a flexible tube 18 which is connected coaxially to the pipe 16 at a connection 20. At its free end, the tube 18 carries a female coupler 22 of a conventional type.

The female coupler 22 is adapted to couple in an airtight manner to a conventional male coupler 24 having a threaded socket. The coupling of the female coupler 22 to the male coupler 24 allows rotation of the male coupler about its axis. The male coupler 24 has a threaded socket enabling it to be screwed onto the end 26 of the spigot of a conventional valve 28, e.g., a heavy duty truck tire valve.

Intersecting the pipe 16 of the evacuation conduit 12 at an intersection 30 is a second, purging conduit 32 in the form of a rigid pipe having a smaller diameter than the pipe 16. It will be noted that, at the intersection 30, the conduit 32 makes an acute angle with that section of the pipe 16 directed towards the female coupler 22. Threaded onto the free end of the conduit 32 is a male coupler 34 similar to the male coupler 24. A pressure gauge 35 is connected to the pipe 16 between the intersection 30 and the ball valve 14.

The numeral 36 designates a female coupler, similar to the coupler 22, which is carried at the end of a hose 37 leading from a source of nitrogen 40 under pressure. The nitrogen source may be a cylinder of compressed nitrogen. Alternatively, the source may be of the type having an in-line filtration unit for removing the oxygen content of a feed air supply and a compressor, in series with the filtration unit, for in-line compression of the remaining nitrogen.

The operation of the illustrated apparatus to evacuate a truck tire fitted with the valve 28 and containing air is as follows. With the conventional valve core unscrewed from the valve 26 and the valve 14 open, the female coupler 22 is coupled to the male coupler 24. Air is accordingly free to exhaust from the tire to atmosphere through the conduit 12. At the same time, the female coupler 36 is coupled to the male coupler 34 at the end of the purging conduit 32 and compressed nitrogen is caused to flow through the purging conduit and into and through the pipe 16. The rapid flow of compressed nitrogen into the pipe 16 at the acute angle intersection 30 causes an internal pressure drop in the conduit 12 at this point by venturi effect. The pressure reduction in the conduit 12 applies an effective suction to the interior of the tire and accelerates the evacuation of the tire to a sub-atmospheric pressure level. It will be seen that the purging conduit 32 enters the pipe 16 and is formed with an internal, curved chamfer which enhances the venturi effect.

When an observer watching the tire sees that the tire wall is starting to collapse, he knows that the desired sub-atmospheric pressure has been attained in the tire. The tire is now re-inflated with nitrogen by closing the valve 14 so that the compressed nitrogen entering the pipe 16 flows in the reverse direction through the conduit 12 to the tire valve 28. The tire is inflated to the eventual, desired tire inflation pressure, at which time the supply of compressed nitrogen is terminated. The pressure gauge 35 provides a visual indication of the required tire pressure.

The female coupler 22 is now rapidly uncoupled from the tire valve 28, and the valve core is rapidly screwed back into place. Before the valve core is screwed home, some tire pressure will be lost as nitrogen vents directly from the tire to atmosphere. As soon as the valve core is in place, the female coupler can be connected again to the tire valve 28 and the flow of compressed nitrogen re-established to raise the internal tire pressure to the required, final level, as indicated by the pressure gauge 35.

It will be appreciated than an important advantage of the tire deflation and inflation apparatus as described above is the speed with which the air content of the tire is replaced with nitrogen.

In the case of trucks or other vehicle which have double tires, the tire valve of the outer tire may project inwardly. in this situation the female coupler 22 which is used can be of the type which can be inserted inwardly through the rim of the outer wheel and then engaged with the tire valve by pulling the coupler outwardly against the end of the tire valve.

Although in this embodiment nitrogen is used as the purging gas to generate sub-atmospheric conditions in the conduit 12, it will be appreciated that any other suitable gas, under pressure, could be used for this purpose. (carbon dioxide gas may be also used in certain circumstances as well as any other inert gas).

Preferably, the source of nitrogen is a nitrogen-PSA but more preferably is a membrane generator comprising essentially an air compressor to compress air at a pressure which is preferably at least equal to about 10 bar. The compressed air is thereafter filtered (first stages include preferably a water separator, coalescing and particulate filters and an activated carbon tower) to deliver clean dry air containing preferably less than 1 ppm moisture (a dew point of =70° C. or less), preferably less than 0.01 micron particulates and preferably no detectable residuals oil vapor. The dry clean air is thereafter directed to membrane modules (at least one) wherein, by selective permeation of O2 through a glassy polymer membrane (such as polyimide, polyamide, polysulfone and derivatives thereof) from which the non permeate gas enriched in nitrogen, is withdrawn at a pressure substantially equal to the pressure of the feed gas (air). Preferably, such nitrogen generator comprises an oxygen sensor and an oxygen monitoring system, in order to monitor the oxygen content of the <<impure>> nitrogen gas generated. Also it is preferred to provide a surge tank connected between (or in parallel to) the generator and the tire wherein the pressure is preferably maintained greater than the normal pressure for use of the nitrogen, usually about 10 bar or even more.

Appropriate membrane generators are for example those of the M 500 C. series of FLOXAL (a trademark of L'AIR LIQUIDE) Nitrogen membrane generators, as disclosed e.g. in the Tech Specs of such systems, incorporated therein by reference (those generators can usually provide nitrogen at different flow rates and different purities from about 95% vol. inert gas to 99.5% inert gas).

To determine the maximum oxygen content in the tire, more particularly applicable to truck tires, it has been found that one should apply the following formula:

$$\text{atmospheric pressure} \times \text{O2 content of air} = \text{Tire pressure} \times \text{maximum O2 \% vol in tire}$$

In practice, as the atmospheric pressure at sea level is about 100 Kpa and the oxygen content is about 21% vol.:

$$\text{Tire pressure (kPa)} \times \text{Maximum O2 \% vol. in tire} \cong 100 \times 21$$

$$\text{Maximum O2 \% vol. in tire} \cong \frac{2100}{\text{Tire pressure (kPa)}}$$

For a truck tire which pressure is usually about 700 Kpa, the maximum oxygen content is thus about 3% vol.

To confirm the applicability of this formula, it has been discovered that if the O2% vol is correct in the tire (less than 5% vol.) the pressure loss in a truck tire is 3 to 4 times slower than with air. (to reach the same pressure)

As an example, using the device described in this specification, and nitrogen from a membrane generator (97% vol. purity) as disclosed hereabove at a pressure of about 10 bar, the air in the tire is <<vacuumed>> out in about 7 to 8 minutes and the tire refilled with this nitrogen (97% vol.) has an oxygen content of about 3% vol.

While the invention has been described in detail with reference to preferred embodiments thereof, it will be apparent to one skilled in the art that various changes can be made, and equivalents employed, without departing from the scope of the invention.

What is claimed is:

1. A method of inflating a tire comprising the steps of:
   providing a tire mounted on a rim, said tire comprising a tire valve to allow selective inflation or deflation of said tire, said tire being filled with a certain amount of air;
   deflating said tire to reach a pressure less than or equal to atmospheric pressure by conducting a purge gas away from said tire valve, and into and at an acute angle to a gas flow path in fluid communication with said tire valve;
   inflating said tire with a source of inert gas to reach a pressure at least equal to a pressure greater than atmospheric pressure, to obtain inside said tire a gas mixture comprising between 5% $O_2$ by volume and 0.5% $O_2$ by volume.

2. A process according to claim 1, wherein said source of inert gas is a source of gas comprising a gas selected from the group consisting of nitrogen, argon, and mixtures thereof.

3. A process according to claim 2, wherein said source of inert gas comprises at least 95% insert gas by volume.

4. A process according to claim 2, wherein said source of inert gas comprises at least 97% of inert gas by volume.

5. A process according to claim 1, wherein said source of inert gas is provided by a membrane generator wherein air is fed to a membrane at a pressure greater than atmospheric pressure, said membrane permeating oxygen through it, said oxygen permeate being vented, while nitrogen is substantially not permeated through the membrane, a non-permeate gas or gas mixture being recovered at a pressure which is substantially similar to that of the feed gas.

6. A method according to claim 1 wherein the tire valve is opened by removing the core therefrom.

7. A method according to claim 1 wherein the inert gas is nitrogen.

8. A method of inflating a tire according to claim 1, wherein said step of deflating comprises the step of conducting said purge gas from said source of inert gas.

9. A method of inflating a tire including a tire valve with an inert gas, comprising the steps of:
   coupling a first conduit to said tire valve, said tire valve being open to allow gas with which the tire is already charged to escape along said first conduit;
   creating a subatmospheric pressure in said first conduit by directing a purging gas under pressure into said first conduit through a second conduit which intersects said first conduit at a position remote from said tire valve and at an acute angle to a portion of said first conduit between said position and said tire valve, said purging gas being directed into said first conduit in a downstream direction, the gaseous contents of the tire being withdrawn along the first conduit;
   uncoupling said first conduit from said tire valve once a required degree of evacuation of said tire has been achieved; and
   inflating said tire to a predetermined pressure with an inert gas through said tire valve.

10. A method of inflating a tire according to claim 9, wherein the purging gas is nitrogen.

11. A method according to claim 9 wherein the tire valve is opened by removing the core therefrom.

12. A method according to claim 9 wherein the inert gas is nitrogen.

13. A method of deflating a tire and thereafter re-inflating it, through a tire valve associated with the tire, with an inert gas, the method including the steps of:
   opening the tire-valve in and connected a first end of a first conduit thereto so that gas can vent from the tire to atmosphere through an opposite, second end of the first conduit;
   introducing compressed inert gas into the first conduit by directing said compressed inert gas under pressure into said first conduit through a second conduit which intersects said first conduit at a position remote from said tire-valve and at an acute angle to a portion of said first conduit between said position and said tire valve, to cause a pressure reduction in the first conduit which increases the rate at which gas is vented to atmosphere from the tire; and
   when the gas pressure in the tire reaches a sub-atmospheric level, closing the second end of the first conduit so that the compressed inert gas flows back along the first conduit and into the tire through the valve, thereby to re-inflate the tire with the inert gas.

14. A method according to claim 13 wherein the tire valve is opened by removing the core therefrom.

15. A method according to claim 14 wherein, after the tire has been re-inflated with the inert gas, the first end of the first conduit is disconnected from the tire valve, the core of the tire valve is replaced, and further compressed inert gas is introduced into the tire to replenish the tire with inert gas lost from the tire during such disconnection and core replacement and to inflate the tire to a final, desired inflation pressure.

16. A method according to claim 13 wherein the inert gas is nitrogen.

17. A tire deflation and inflation apparatus for deflating a tire and thereafter inflating it with an inert gas, the tire having a tire valve associated therewith, the apparatus comprising:
   a first conduit a least a portion of which is flexible;
   a tire valve coupler at a first end of the first conduit by means of which the first conduit can be coupled to the tire valve, after opening of the tire valve, so that gas can vent from the tire to atmosphere through an opposite, second end of the first conduit;
   a control valve in the first conduit;
   a second conduit which intersects the first conduit at a point between the tire valve coupler and the control valve, said first conduit and said second conduit forming an acute angle between said second conduit and a portion of said first conduit between said point and said first end; and
   a coupler at a free end of the second conduit by means of which the second conduit can be connected to a source of compressed inert gas;
   wherein the intersection between the first conduit and the second conduit is such that compressed inert gas introduced into the first conduit through the second conduit causes a pressure reduction in the first conduit which increases the rate at which gas is vented to atmosphere from the tire and enable the tire pressure to be reduced to a subatmospheric level; and wherein closure of the control valve after such reduction of the tire pressure causes compressed inert gas to flow back along the first conduit and into the tire through the tire valve, thereby to re-inflate the tire to a required level with the inert gas.

18. An apparatus according to claim 17 wherein the first conduit includes a flexible portion carrying the tire valve coupler and a rigid portion to which the first portion is connected and at which the first conduit is intersected by the second conduit.

19. An apparatus according to claim 18 comprising a pressure gauge connected to the rigid portion of the first conduit.

20. An apparatus according to claim 18 wherein the rigid portion of the first conduit is provided by a first rigid pipe and the second conduit is provided by a second rigid pipe of smaller diameter than the first rigid pipe.

21. An apparatus according to claim 18 wherein the rigid portion of the first conduit is provided by a first rigid pipe and the second conduit is provided by a second rigid pipe of smaller diameter than the first rigid pipe.

22. An apparatus according to claim 17 wherein the control valve is a manually operable ball valve.

23. An apparatus according to claim 17 wherein the first conduit includes a flexible portion carrying the tire valve coupler and a rigid portion to which the first portion is connected and at which the first conduit is intersected by the second conduit.

24. A process for evacuating gas from the interior of a tire comprising the steps of:

providing an apparatus according to claim 17;

reducing the pressure in the first conduit to increase the rate at which gas is vented to atmosphere from the tire and thereby reducing the pressure within the tire to a subatmospheric level.

25. A tire evacuation apparatus comprising:

a first conduit including a free end, a second end, and a flexible portion extending between said free end and said second end;

a tire valve coupler at said free end of said flexible portion of said first conduit for coupling said first conduit to a tire valve;

a second conduit intersecting said first conduit at an intersection between said first conduit free end and said first conduit second end, said second conduit making an acute angle with that section of the first conduit between said intersection and said free end, said second conduit including a free end; and a coupler at said free end of said second conduit for coupling said second conduit to a source of purging gas under pressure, wherein when said tire valve coupler is coupled to said tire valve of a tire which is to be evacuated, and purging gas is directed under pressure into said first conduit through said second conduit, the gaseous contents of the tire are withdrawn to a subatmospheric pressure level through said first conduit second end.

26. A process of evacuating a gas from a tire, comprising the steps of:

providing an apparatus according to claim 25;

directing a purging gas under pressure into said first conduit through said second conduit to thereby withdraw the gaseous contents from the tire from said tire to create a subatmospheric pressure level in said tire.

27. A tire evacuation apparatus according to claim 25, wherein said first conduit further comprises a control valve for selectively controlling the flow of gas through said first conduit second end.

28. A method of inflating a tire comprising the steps of:

providing a tire mounted on a rim, said tire comprising a tire valve to allow selective inflation or deflation of said tire, said tire being filled with a certain amount of air;

deflating said tire to reach a pressure less than or equal to atmospheric pressure by conducting an inert gas from a source of inert gas away from said tire valve and into a gas flow path in fluid communication with said tire valve;

stopping the flow of inert gas in the gas flow path;

inflating said tire with inert gas from said source of inert gas through said gas flow path to reach a pressure at least equal to a pressure greater than atmospheric pressure, to obtain inside said tire a gas mixture comprising between about 5% $O_2$ by volume and about 0.5% $O_2$ by volume.

* * * * *